March 21, 1950
B. HONALD
2,501,517
WILD GOOSE BLIND
Filed July 16, 1945
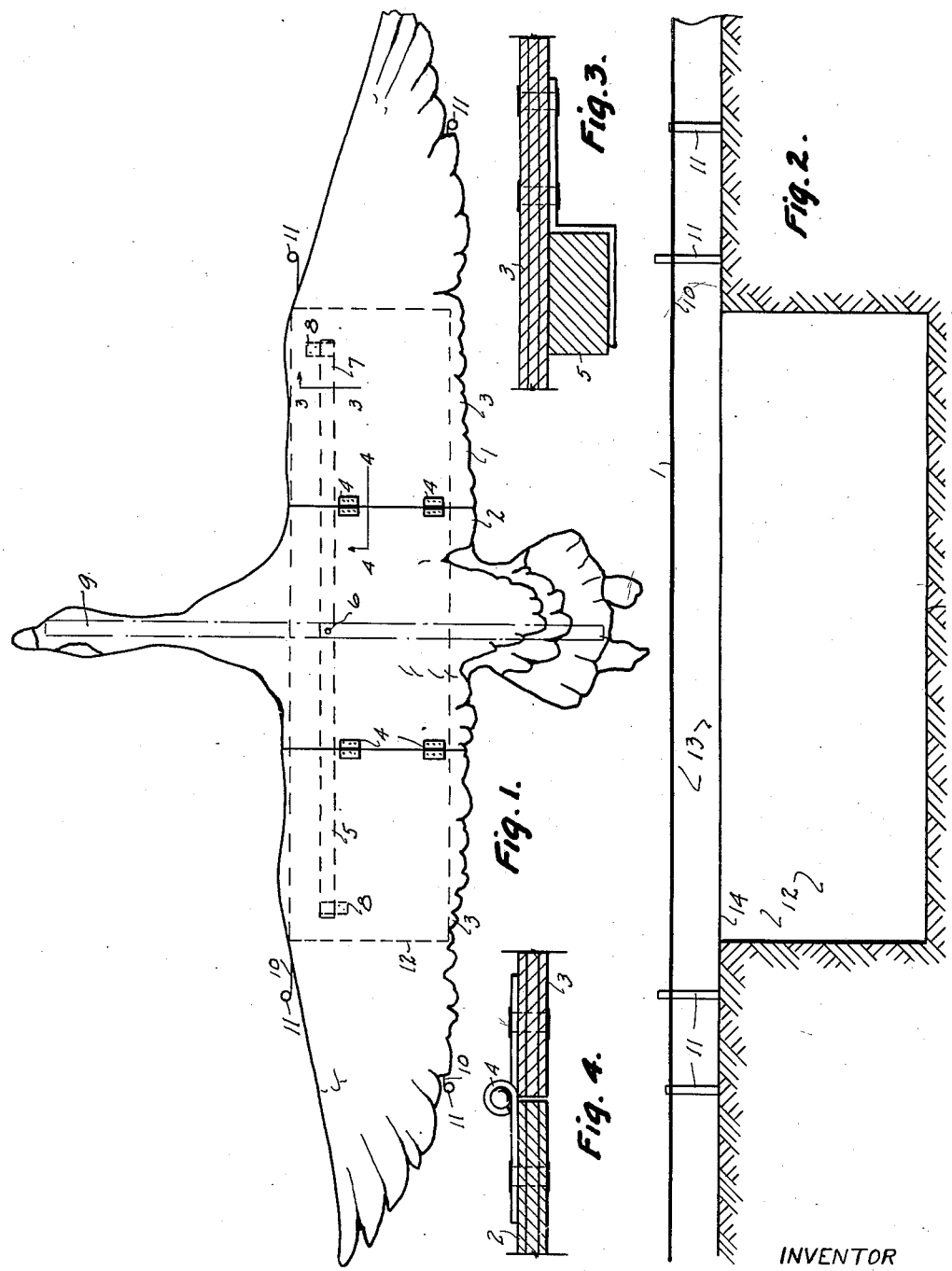
INVENTOR
Barney Honald
BY Emmet G. Stark
ATTORNEY Patented Mar. 21, 1950

2,501,517

UNITED STATES PATENT OFFICE 2,501,517

WILD-GOOSE BLIND

Barney Honald, The Dalles, Oreg.

Application July 16, 1945, Serial No. 605,267

1 Claim. (Cl. 43—2)

My invention relates to means thru the use of which hunters may be within range of feeding wild geese and has for its objective the attraction of the geese and a cover for the hunter.

My invention is illustrated in the accompanying drawings of which Fig. 1 is a plan view showing the pit covered by a counterpart of a wild goose; Fig. 2 is a vertical section of the pit with the cover above it; Fig. 3 is a vertical section on 3—3 of Fig. 1; Fig. 4 is a vertical section on 4—4 of Fig. 1.

Thruout the drawings and the specification similar numerals refer to similar parts.

Wild geese and brant are the wariest of all wild creatures. They usually feed in open grain fields with some of their number always on the watch while the others are feeding. At the slightest sign of danger the signal is given by the sentry and away they go.

It has been common practice for hunters to dig pits and cover them in various ways. However, unless the cover blends in perfectly with the surrounding ground the geese will give it a wide berth.

The geese approach their feeding grounds from the air hence their range of vision is very great. I find that if they note their counterpart below they lose their wariness.

I usually cut my pit cover 1 from a 4' x 8' sheet of plywood, "Masonite," or other sheet material, to the configuration of a goose in flight as illustrated in Fig. 1. The top of the cover is painted in flat colors to resemble the coloring and markings of the plumage. Fig. 1 only shows the configuration but it is to be understood that the coloring (not shown) is a requisite of my invention.

A pit cover representing a goose with an 8' wing spread is an unwieldy object to pack hence I have divided the cover into a body portion 2 and the two wing portions 3 hingedly secured to the body portion by the butts 4 preferably of the loose pin type so that the wing portions may be readily detached from the body portion to make up a more compact package for packing on a hunting trip.

To hold the cover 1 in a rigid extended assembly I have provided the stiffening bar 5 pivotably connected to the body portion by a bolt or rivet 6. The bar 5 may be moved about its pivot to the position shown at 7 where its outer ends are received in the open-ended clips 8. When the cover is disassembled for packing the bar 5 is moved to the position indicated by the numeral 9. It will be apparent to mechanics, from the disclosures, that other means may be employed to secure the body and wing sections together and hold them in extended position. However, the method illustrated works very satisfactory.

In using my pit cover one or more pits are dug, depending upon the number of hunters in the party, of a size that may be covered by the configuration of the goose which constitutes the pit cover 1.

This cover 1 is supported upon wires 10 stretched between stakes 11 driven into the ground on the opposite sides of the pit 12. These wires 10 are placed at a height above the ground which approximates the eye level of the goose when he is not feeding. When the geese are coming in from the air they only see the top of the configuration. When they are on sentinel duty they only see a narrow line from $\frac{1}{16}$" to $\frac{1}{4}$" in width. When they are feeding their eyes are on the ground and their attention is given to the job at hand. This positioning of the cover 1 above the ground also serves to provide shooting space 13 for the hunter in all directions who, until he hears the chattering of the feeding geese sufficiently loud to know that they are within range, keeps his head below the top of the ground 14.

In arranging the hunting ground I scatter a number of the covers 1 about letting them lay directly on the ground and also use life-size decoys (not shown) cut from sheet material and painted on each side and so formed that they represent geese feeding and on sentinel duty.

I am aware that pits and decoys have been previously used but I am not aware that a pit cover representing the configuration of a goose in flight has ever been used or used in the manner I have disclosed.

What I claim as new over the prior art is embraced in the following claim:

The method of arranging a wild goose blind which consists of digging a pit in an area frequented by feeding geese, forming a configuration of a goose out of sheet material, marking and coloring one side of said sheet material so that the marking, coloring, and configuration has the characteristic general appearance of a goose, supporting the material so formed above the pit so as to cover the entire pit while spacing the configuration so as to provide between the pit and the configuration an opening around the boundaries of the material sufficient to allow a hunter in the pit ample space to observe and position his gun so as to shoot at a goose on the ground in the vicinity of the pit.

BARNEY HONALD.

REFERENCES CITED

The following references are of record in the file of this patent:

UNITED STATES PATENTS

| Number | Name | Date |
| --- | --- | --- |
| 261,910 | Cochel | Aug. 1, 1882 |
| 586,145 | Sievers, Jr. | July 13, 1897 |
| 1,083,882 | Hindmarsh | Jan. 6, 1914 |
| 1,545,714 | Traylor | July 14, 1925 |
| 1,731,097 | Frailey | Oct. 8, 1929 |
| 2,028,549 | Shay | Jan. 28, 1936 |
| 2,341,028 | Fay | Feb. 8, 1944 |

FOREIGN PATENTS

| Number | Country | Date |
| --- | --- | --- |
| 1,550 | Great Britain | Apr. 15, 1880 |
| 406,386 | Great Britain | Mar. 1, 1934 |